United States Patent
Feinberg (10) Patent No.: US 7,110,421 B2
(45) Date of Patent: Sep. 19, 2006

(54) SYSTEM AND METHOD FOR TRANSMITTING INFORMATION OVER MULTIPLE CHANNELS

(75) Inventor: Paul H. Feinberg, River Vale, NJ (US)

(73) Assignees: Sony Corporation, (JP); Sony Electronics Inc., Park Ridge, NJ (US)

( * ) Notice: Subject to any disclaimer, the term of this patent is extended or adjusted under 35 U.S.C. 154(b) by 834 days.

(21) Appl. No.: 09/996,105

(22) Filed: Nov. 28, 2001

(65) Prior Publication Data

US 2003/0099256 A1    May 29, 2003

(51) Int. Cl.
*H04J 3/24* (2006.01)
*H04J 3/16* (2006.01)
(52) U.S. Cl. .................. 370/473; 370/437; 370/465
(58) Field of Classification Search ............... 370/345, 370/437, 442, 458, 464, 473, 498
See application file for complete search history.

(56) References Cited

U.S. PATENT DOCUMENTS

| | | | |
|---|---|---|---|
| 4,868,811 A * | 9/1989 | Suzuki | 370/436 |
| 5,355,114 A * | 10/1994 | Sutterlin et al. | 375/347 |
| 6,532,268 B1 * | 3/2003 | Morisawa | 375/257 |
| 6,775,257 B1 * | 8/2004 | Watanabe | 370/335 |
| 6,826,160 B1 * | 11/2004 | Wang et al. | 370/329 |
| 6,973,067 B1 * | 12/2005 | Haartsen | 370/337 |
| 2001/0008391 A1 * | 7/2001 | Yuasa | 340/310.01 |
| 2002/0114311 A1 * | 8/2002 | Mazur et al. | 370/347 |

* cited by examiner

Primary Examiner—Chi Pham
Assistant Examiner—Justin M. Philpott
(74) Attorney, Agent, or Firm—Lerner, David, Littenberg, Krumholz & Mentlik, LLP (57) ABSTRACT

A method and system of transmitting packets of information over multiple channels such that the packets are sent simultaneously and serially across and down the channels.

8 Claims, 3 Drawing Sheets

SYSTEM AND METHOD FOR TRANSMITTING INFORMATION OVER MULTIPLE CHANNELS

BACKGROUND

The telecommunication industry and broadcasting industry share a common vision of offering content on demand. Such content can include audio or visual information or both, such as songs, books or videos. Typically, the content is converted into digital information such as files or packets of information and transmitted to a user over a network. These networks can be wired or wireless, such as broadband cable or cellular telephone networks. They can also be a combination of both.

Typically, at any given moment, the network will simultaneously connect many different users to many different sources of information. Accordingly, it is necessary to configure the network so that different information can be simultaneously sent to different destinations.

One of the techniques for doing this involves dividing the medium of the network into channels, i.e., pathways of communication between two or more nodes of the network. For example, television stations simultaneously broadcast different programs to different people through the same medium (the air) by transmitting television programs at different frequencies. Television viewers select the information they wish to receive by tuning their television to the frequency of that channel. Cable networks can similarly transmit different information at different frequencies over the same wire so that different people can simultaneously receive different programs. Moreover, channels may be created by the use of other techniques known to those of ordinary skill in the art other than frequency, such as spatial or code division.

Even so, the increasing number of users demanding a greater diversity of content and information has created greater and greater demands on networks. Accordingly, there is a need for a system and process which can effectively use channels to deliver different information both quickly and accurately.

SUMMARY OF THE INVENTION

The present invention provides a system and method of allocating resources across different channels.

One aspect of the invention provides a method of transmitting a collection of information over a multi-channel medium. The method includes: associating a first packet of information with a portion of the collection and associating a second packet of information with another portion of the collection; during a first time period, transmitting the first packet over a first channel of the medium and a second packet over a second channel of the medium; during a second time period, transmitting the first packet over the second channel of the medium; during a third time period, transmitting the second packet over the first channel of the medium; whereby the first time period is a different time period than the second or third time periods.

Another aspect provides a method of transmitting a plurality of packets of information over a multi-channel medium. Each packet is allocated to a channel of the medium and during a first time period, each packet is transmitted on its allocated channel. Each packet is also re-allocated to a channel of the medium such that the packet is not allocated to a channel it was allocated to during the first time period. During a second time period after the first time period, each packet is transmitted on its allocated channel.

Yet a further aspect of the invention provides a method of transmitting a plurality of messages over a medium. The method includes: associating portions of a first message with selected channels of the medium such that each portion is associated with a different channel; for each selected channel which is available for transmission and during a first time period, transmitting the first message portions on their associated channels; associating portions of a second message with the channels of the medium such that each portion is associated with a different channel; for each selected channel which is available for transmission and during a second time period, transmitting the second message portions on their associated channels; re-associating the first message portions with selected channels of the medium such that each portion is associated with a channel different from both the other portions and the channel with which it was associated during the first time period; for each selected channel which is available for transmission and during a third time period, transmitting the second message portions on their re-associated channels; and re-associating the second message portions with selected channels of the medium such that each portion is associated with a channel different from both the other portions and the channel with which it was associated during the second time period; and for each selected channel which is available for transmission and during a fourth time period, transmitting the second message portions on their re-associated channels.

Yet another aspect of the invention involves a method of sending a collection of packets over selected channels. During a first time period, each packet of the collection is sent substantially simultaneously such that each packet is sent over a different channel from another one of the packets. During subsequent time periods, the prior step is repeated until each packet has been sent at least once on each channel.

The invention also provides for a system of transmitting information. The system includes: a source of information, the source including a processor capable of executing instructions; a destination for information; and a medium connecting the source to the destination, the medium including a set of channels, each channel being capable of simultaneously carrying information different from the other channels; the instructions including transmitting a collection of packets of information over a plurality of time periods whereby during any one time period, each packet of the collection is simultaneously transmitted with the other packets such that each packet is associated with a channel different from the other packets, and whereby over a plurality of time periods, each packet of the collection is transmitted at least once on each channel.

Another system transmits a collection of information over a multi-channel medium. It includes means for associating a first packet of information with a portion of the collection and a second packet of information with another portion of the collection, means for transmitting the first packet over a first channel of the medium and a second packet over a second channel of the medium during a first time period, means for transmitting the first packet over the second channel of the medium during a second time period, and means for transmitting the second packet over the first channel of the medium during a third time period, whereby the first time period is a different time period than the second or third time periods.

Yet another system transmits a collection of packets over selected channels. This system includes means for transmitting each packet of the collection substantially simultaneously during a first time period such that each packet is transmitted over a different channel from another one of the packets; and means for repeating the prior step during subsequent time periods until each packet has been transmitted at least once on each channel.

DETAILED DESCRIPTION OF THE INVENTION

Figure 1:
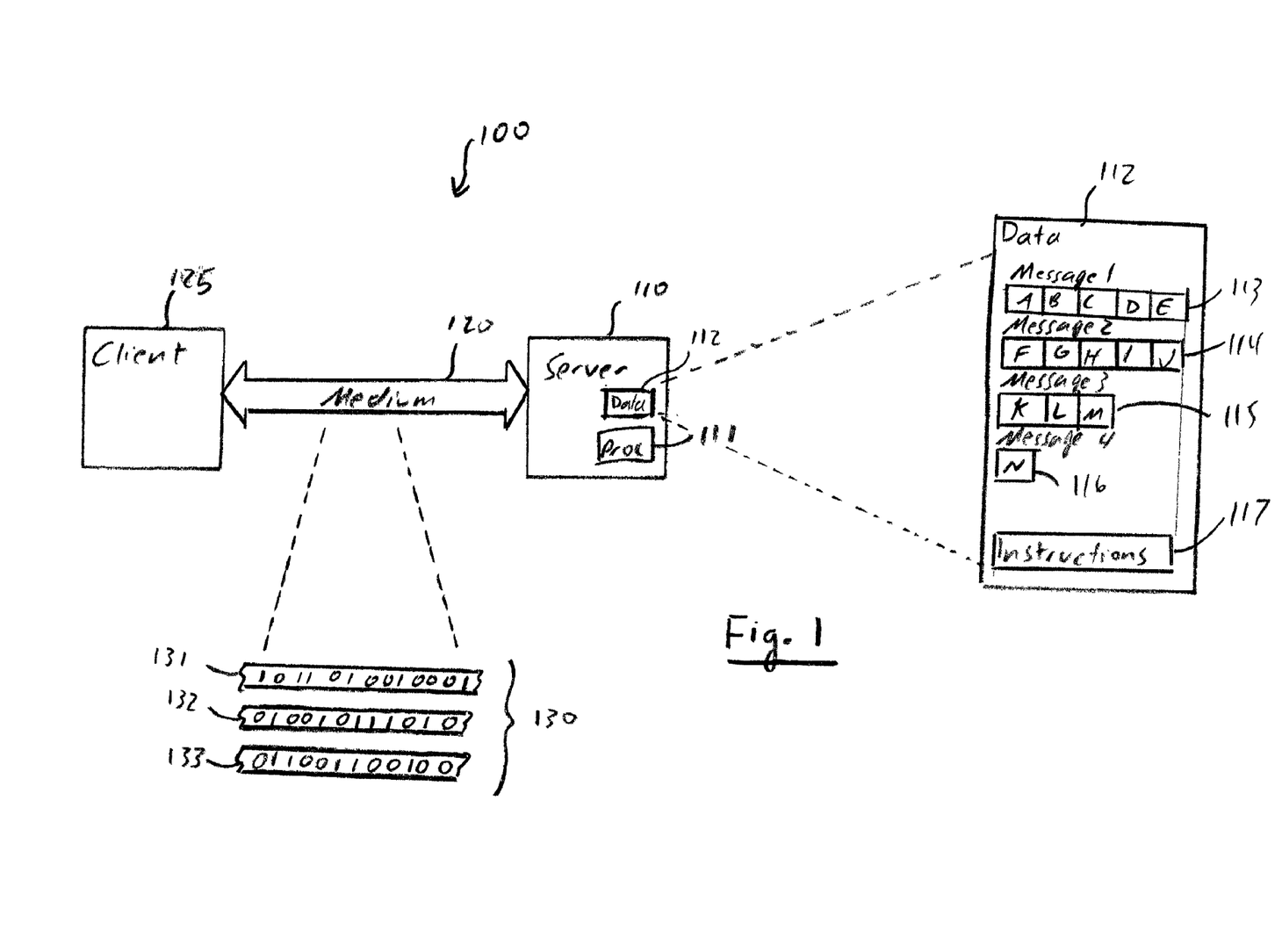

A system 100 in accordance with the present invention is shown in FIG. 1. The system includes a server 110 and a client 125 which communicate via a medium 120. It should be understood that the server 110 and client 125 may be just two nodes of a far larger network, such as but not limited to a broadband cable system, wireless network or the Internet.

Preferably, the server 110 and client 125 include processors and data whereby the processors execute instructions in accordance with programs. For example, server may include a processor 111 and a collection of data 112. The data includes instructions or programs 117 which are executed by the processor and manipulate data 112.

The data may include a variety of files or messages 113-16. These files may represent any sort of information to be delivered over the network such as electronic mail, a song or a movie. The message is preferably divided into packets so that each packet is associated with a portion of the information (as represented by reference letters A–N) in a manner known to those of ordinary skill in the art. Alternately, each packet may comprise a whole message.

Medium 120 may comprise any multi-channel medium, such as the atmosphere in the case of a wireless network or wires in the case of a wired network. Information is transmitted over the medium by channels 130 in any manner known to those of ordinary skill in the art, such as by different frequencies through the atmosphere. As shown in FIG. 1, each channel 131-33 is capable of sending its own separate stream of information such as digital information comprising ones and zeros.

Figure 2:
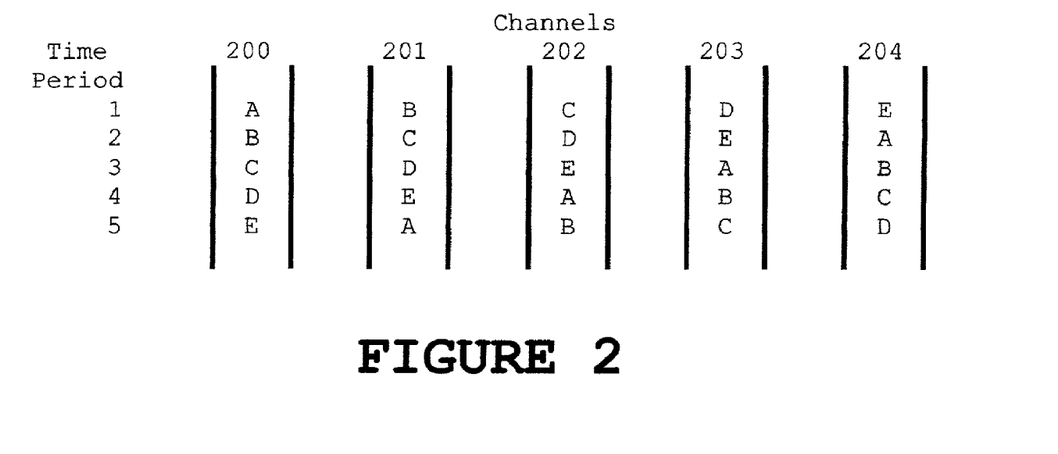

FIG. 2 provides an illustrative example of a method of sending a single message in accordance with an aspect of the invention. For the purposes of illustration, the message shall be assumed to be comprised of five different packets A–E sent over a medium having five different channels 200–204.

During a first time pulse or time period 1, each packet of the message is sent over a single channel. Thus, packet A is sent over channel 200, packet B is sent over channel 201, packet C is sent over channel 202, packet D is sent over channel 203 and packet E is sent over channel 204; all are sent at substantially the same time in single burst. During the next time period, each packet is again sent over a single channel, but this time each packet is sent over a different channel. For example, during time period 2, packet A is sent over channel 201, packet B is sent over channel 202, packet C is sent over channel 203, packet D is sent over channel 204 and packet E is sent over channel 200.

The process of sending a packet simultaneously with the other packets during a single time period and then sending the packet again on a different channel (and the other packets on different channels) continues until each packet has been sent at least once on each channel. As shown in FIG. 2, it takes five time periods to transmit the five packet message via a five-channel medium.

Figure 3:
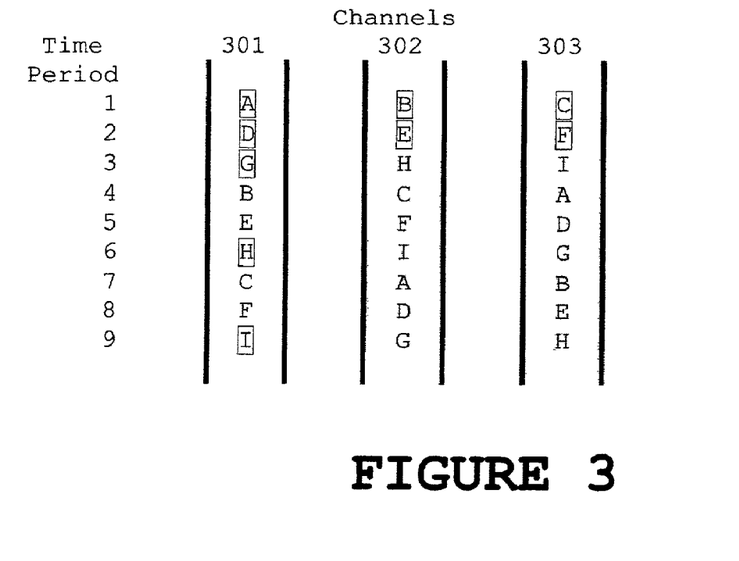

FIG. 3 provides an illustrative example of sending multiple messages over channels of varying availability. For the purposes of illustration, it shall be assumed that three messages (ABC, DEF, GHI) of three packets each (A, B and C; D, E and F; G, H and I) are to be sent by the server to the client over a three channel medium. The example of FIG. 3 shall further be considered in accordance with the aspect of the invention represented by the flow chart of FIG. 4.

Figure 4:
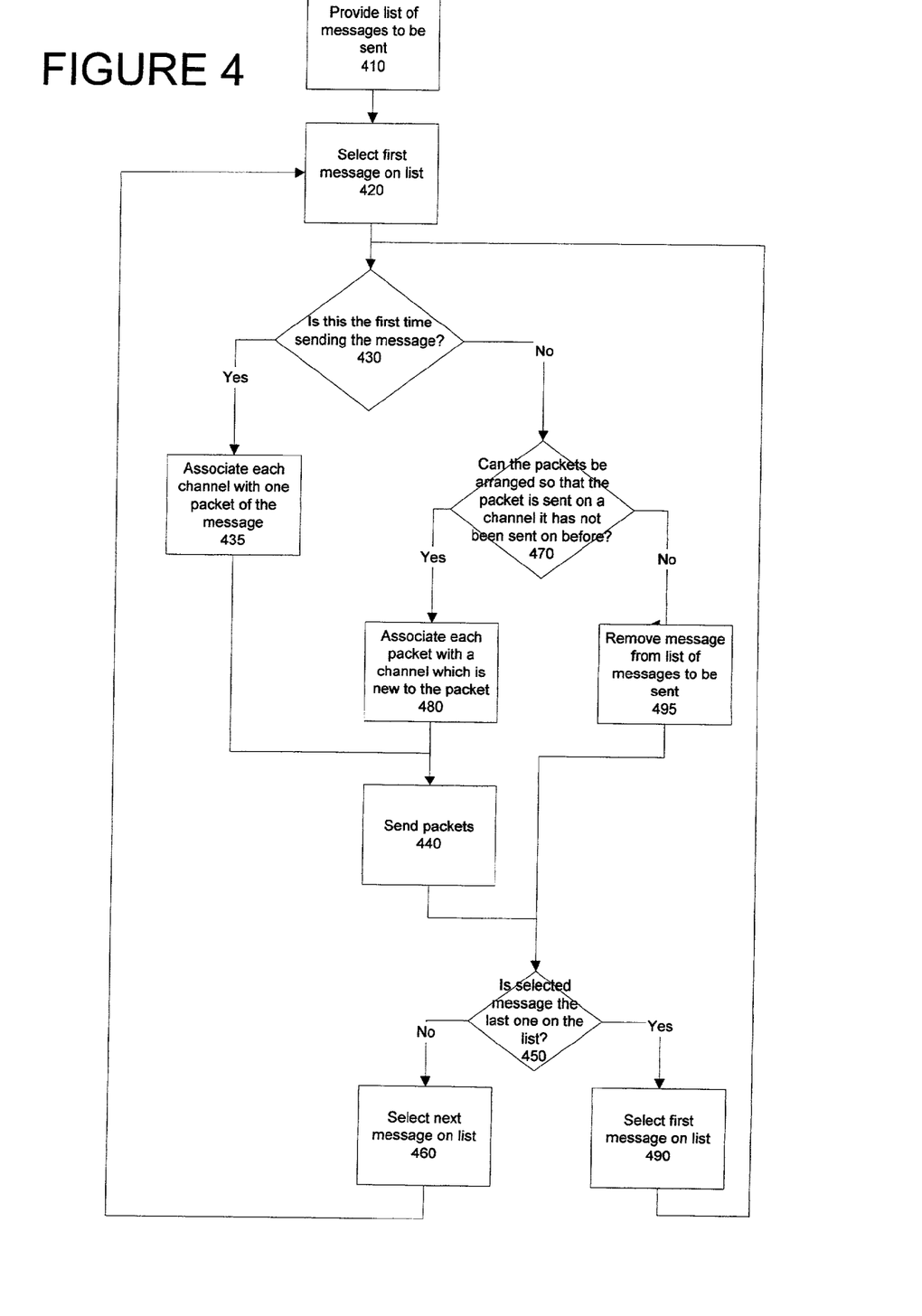

First, the processor identifies a list of the messages to be sent, such as messages ABC, DEF and GHI (step 410). The first message of the list, namely ABC, is selected (step 420.) If this is the first time the message is being sent (step 430), then each packet of the message is associated with a single channel, such as packet A with channel 301, packet B with channel 302 and packet C with channel 303 (step 435). The packets associated with each of the channels are then sent during the same time period 1 (step 440).

After the packets from one message are sent, another message is selected. The server determines whether the message just sent was the last message on the list (step 450) and, if not, selects the next message (460) such as message DEF.

The process then continues as described in connection with the prior message. In other words, if message DEF has not been selected yet, then each of its packets is associated with a single channel (step 435), the packets are sent during a single time period (step 440), and the next message, such as message GHI, is selected (steps 450, 460).

One advantage of the invention is its ability to handle changing channel availability. For example, as shown by the shaded portion of FIG. 3, channels 302 and 303 may become unavailable; they may have been temporarily or permanently severed or allocated to higher-priority information. Regardless of the reason why, an advantage of the invention is that it can still deliver entire messages even if—unbeknownst to the server—certain channels become unavailable.

For instance, the processor associates each of the packets of message GHI to one channel 301-303 regardless or unaware of the fact that channels 301 and 302 are unavailable (step 435). During time period 3, the processor attempts to transmit all of the packets (step 440), but only packet G will be received at the client because channels 301 and 302 (allocated to packets H and I, respectively) are unavailable.

As before, the processor will check whether the most-recently sent message is the last message on the list. (step 450). Because message GHI is the last message, the process continues as before with message ABC, the first message on the list.

This time, however, the processor will determine that message ABC has already been sent before (step 430). In response, the processor determines whether the packets can be rearranged so that each packet is associated with a different channel than it had been in the past (step 470). If it can, then each packet is allocated to a channel that it had not been assigned to in the past (steps 480, 440). Thus, during time period 4, packet B is assigned to channel 301, packet C is assigned to channel 302, packet A is assigned to channel 303, and the packets are transmitted. If channels 302 and 303 are still unavailable, only packet B will actually be delivered. The process continues during time period 5 with respect to message DEF.

During time period 6, packet H will be allocated to channel 301. Consequently, although packet H was previously associated with an unavailable channel and never actually delivered, packet H will now be associated with channel 301. Because channel 301 is available, packet H will be delivered upon transmission. (Packet I is sent on channel 301 three time periods later.)

At some point, each packet of the message will have been associated with each channel. When that point is reached, no further packets of the message are sent (step 495).

The boxes surrounding the individual packets of FIG. 3 show the first time that the packet will be received by the client. Thus, the entire message ABC will have been received by time period 1, the entire message DEF will have been received by time period 2, and the entire message GHI will have been received by time period 9.

Accordingly, one aspect of the invention provides a method of transmitting packets of a message simultaneously across multiple channels as well as serially down each individual channel.

Another advantage of the invention is its ability to handle clients with different channel limitations. For instance, some receivers may have multiple channels and others may have only a single channel. By sending the information in accordance with the present invention, the same content could be sent to and received by both receivers despite their different channel limitations. In fact, even without making any allowance for the different channels, the receiver with multiple channel capacity is likely to receive the information before the receiver with single channel capacity. Accordingly, the invention is able to capitalize on receivers having increased bandwidth capabilities. Moreover, because the information is redundantly sent over various and different channels, the multiple-channel receiver could be turned on after the single-channel receiver and still receive the information, and potentially more quickly than the other receiver.

In another aspect of the invention, the server dynamically assigns packets to channels based on availability. For example, the invention would not assign packets to unavailable channels. Rather, if all of the channels are simultaneously available, then the message could be packetized and sent in a single burst. However, if only one channel is available initially, then as soon as other channels become available more packets could be sent at once. Alternatively, higher priority packets from other messages may be sent in place of packets which have already been sent over a different channel.

Yet another advantage of the invention is its applicability to a large variety of implementations. Multi-channel systems are becoming more and more popular. Satellite systems use multi-channel per carrier systems. OFDM systems allow data to be spread over several subcarriers. Each subcarrier typically carries a portion of data from a single message whereas the combination of several subcarriers is used to send data over only one channel. However, the invention could be used to allocate data for a given message over subcarriers if the subcarriers are themselves dynamically allocated. Some systems may need to optimize the bandwidth used at any given time. The system may therefore limit the number of subcarriers used during packet transmission. By adhering to this special sequence of transmission, it may be possible to increase or decrease the number of subcarriers being used without interrupting the flow of data transmission for a given message.

In addition, the packets do not have to be sent absolutely simultaneously. For example, during a single time period, one packet may be sent on one channel before another packet is sent on another channel. Alternatively, the durations of actual transmission may overlap when two packets on two different channels are sent during the same period. Thus, although all of the packets are sent during the time period, they may be sent consecutively during the time period rather than concurrently.

Furthermore, it is not necessary to transmit the packets on every channel available on the medium. For instance, the five channels of FIG. 2 may comprise five channels of a medium having many more channels. An advantage of the invention is that it can be applied to only selected channels of the medium.

Another advantage of the invention is its flexibility and ability to implement additional optimization. For instance, if the sending node is aware that channels have become unavailable, then for the remaining channels, packets that have never been sent are given priority over packets that were sent over other channels. In accordance with this embodiment and using the sample values of FIG. 4, packets H and I would be sent over channel 301 before packets B, E, C and F because packets B, E, C and F were already sent over channels 301 and 302. Once the higher-priority packets (H and I) are sent, then the remaining packets (B, E, C and F) would be sent.

Unless stated to the contrary, use of words such as "including," "containing," "such as," "comprising" and the like, means "including without limitation" and shall not be construed to limit any general statement that it follows to the specific or similar items or matters immediately following it. References to a "plurality" of things means at least two of the things, and, unless stated to the contrary, reference to "a" or "one" thing does exclude the possibility of using a plurality of such things.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of transmitting a plurality of packets of information over a multi-channel medium comprising:
    allocating each packet to a channel of the medium;
    during a first time period, transmitting each packet on its allocated channel;
    re-allocating each packet to a channel of the medium such that the packet is not allocated to a channel it was allocated to during the first time period;
    during a second time period after the first time period, transmitting each packet on its re-allocated channel;
    re-allocating each packet to a channel of the medium such that the packet is not allocated to a channel it was allocated to during the first or second time period;
    during a third time period after the second time period, transmitting each packet on its allocated channel;
    selecting a number of the channels of the medium; and
    repeating the steps of re-allocating and transmitting for additional time periods until every packet has been transmitted at least once on every one of the selected number of channels.

2. The method of claim 1 wherein the step of transmitting during a time period comprises transmitting all of the packets simultaneously.

3. The method of claim 1 wherein the step of transmitting during a time period comprises starting transmission of some packets before other packets.

4. The method of claim 1 wherein at least one of the channels is unable to complete transmission of the packet during the time period.

5. A method of transmitting a plurality of messages over a medium comprising:

associating portions of a first message with selected channels of the medium such that each portion is associated with a different channel;

for each selected channel which is available for transmission and during a first time period, transmitting the first message portions on their associated channels;

associating portions of a second message with the channels of the medium such that each portion is associated with a different channel;

for each selected channel which is available for transmission and during a second time period, transmitting the second message portions on their associated channels;

re-associating the first message portions with selected channels of the medium such that each portion is associated with a channel different from both the other portions and the channel with which it was associated during the first time period;

for each selected channel which is available for transmission and during a third time period, transmitting the second message portions on their reassociated channels;

reassociating the second message portions with selected channels of the medium such that each portion is associated with a channel different from both the other portions and the channel with which it was associated during the second time period; and for each selected channel which is available for transmission and during a fourth time period, transmitting the second message portions on their reassociated channels.

6. The method of claim 5 wherein the second time period is after the first time period, the third time period is after the second time period and the fourth time period is after the third time period.

7. The method of claim 5 wherein the messages comprises content.

8. The method of claim 5 wherein the selected channels comprise all of the channels of the medium.

* * * * *

UNITED STATES PATENT AND TRADEMARK OFFICE
CERTIFICATE OF CORRECTION

PATENT NO.        : 7,110,421 B2
APPLICATION NO. : 09/996105
DATED             : September 19, 2006
INVENTOR(S)       : Feinberg et al.

It is certified that error appears in the above-identified patent and that said Letters Patent is hereby corrected as shown below:

Delete Title page illustrating a figure(s), and substitute therefor, new Title page illustrating a figure(s). (attached)

Delete drawing sheet 1-3, and substitute therefor drawing sheet 1-3. (attached)

Signed and Sealed this

Third Day of July, 2007

JON W. DUDAS
*Director of the United States Patent and Trademark Office*

United States Patent
Feinberg (10) Patent No.: US 7,110,421 B2
(45) Date of Patent: Sep. 19, 2006

(54) SYSTEM AND METHOD FOR TRANSMITTING INFORMATION OVER MULTIPLE CHANNELS

(75) Inventor: Paul H. Feinberg, River Vale, NJ (US)

(73) Assignees: Sony Corporation, (JP); Sony Electronics Inc., Park Ridge, NJ (US)

(*) Notice: Subject to any disclaimer, the term of this patent is extended or adjusted under 35 U.S.C. 154(b) by 834 days.

(21) Appl. No.: 09/996,105

(22) Filed: Nov. 28, 2001

(65) Prior Publication Data
US 2003/0099256 A1  May 29, 2003

(51) Int. Cl.
*H04J 3/24* (2006.01)
*H04J 3/16* (2006.01)

(52) U.S. Cl. .................. 370/473; 370/437; 370/465

(58) Field of Classification Search .......... 370/345, 370/437, 442, 458, 464, 473, 458
See application file for complete search history.

(56) References Cited

U.S. PATENT DOCUMENTS

| | | | | |
|---|---|---|---|---|
| 4,868,811 A | * | 9/1989 | Suzuki | 370/436 |
| 5,355,114 A | * | 10/1994 | Sutterlin et al. | 375/347 |
| 6,532,268 B1 | * | 3/2003 | Morisawa | 375/257 |
| 6,775,257 B1 | * | 8/2004 | Watanabe | 370/335 |
| 6,826,160 B1 | * | 11/2004 | Wang et al. | 370/329 |
| 6,973,067 B1 | * | 12/2005 | Haartsen | 370/337 |
| 2001/0008391 A1 | * | 7/2001 | Yuasa | 340/310.01 |
| 2002/0114311 A1 | * | 8/2002 | Mazur et al. | 370/347 |

* cited by examiner

*Primary Examiner*—Chi Pham
*Assistant Examiner*—Justin M. Philpott
(74) *Attorney, Agent, or Firm*—Lerner, David, Littenberg, Krumholz & Mentlik, LLP (57) ABSTRACT

A method and system of transmitting packets of information over multiple channels such that the packets are sent simultaneously and serially across and down the channels.

8 Claims, 2 Drawing Sheets

FIG. 2

FIG. 3